United States Patent [19]

Fiorino

[11] 3,786,358

[45] Jan. 15, 1974

[54] METHOD AND APPARATUS FOR DETECTING THE BEGINNING OF DATA BLOCK

[75] Inventor: Benjamin C. Fiorino, Longmont, Colo.

[73] Assignee: International Business Machines Corporation, Armonk, N.Y.

[22] Filed: Dec. 27, 1972

[21] Appl. No.: 318,955

[52] U.S. Cl. ............ 328/138, 307/233, 307/235 R, 324/79 D, 328/141

[51] Int. Cl. ........................ H03k 5/18, H03k 5/153

[58] Field of Search ........................ 307/233, 235 R; 328/127, 138, 140, 141, 146, 162; 324/79 D

[56] References Cited

UNITED STATES PATENTS

| | | | |
|---|---|---|---|
| 3,404,345 | 10/1968 | Marx et al. | 328/141 |
| 3,549,997 | 12/1970 | Rötzel | 328/141 X |
| 3,585,508 | 6/1971 | Crowther | 328/141 X |
| 3,626,307 | 12/1971 | Koyama | 307/233 X |
| 3,670,304 | 6/1972 | Andresen et al. | 328/115 X |
| 3,717,818 | 2/1973 | Herbst | 328/141 |

OTHER PUBLICATIONS

Seith, "Frequency Deviation Indicator"; IBM Tech. Discl. Bull.; Vol. 4, No. 11, p. 38–39, 4/1962.

Zimmerman, "Measuring Frequency Deviation"; Electronic Industries (publication), p. 100–101; 6/1965.

*Primary Examiner*—John W. Huckert
*Assistant Examiner*—L. N. Anagnos
*Attorney*—Homer L. Knearl et al.

[57] ABSTRACT

The base frequency of digital data signal is detected by using the transitions in the digital signal to control the duration of ramp signals generated by ramp generators. One ramp is restarted by each positive transition while a second ramp is restarted by each negative transition. Comparators monitor each ramp and compare the ramp against a threshold level. The threshold is set so that the comparator will change its state of output at a time period $T = \frac{1}{2}f$ where $f$ is the base frequency of the expected data signal. The outputs from the two comparators are exclusive-OR'd to produce a signal whose duration is a measure of the frequency departure of the input data signal from the expected data frequency. The output of the exclusive-OR is integrated to obtain an average DC voltage level which is a measure of the frequency of the input data signal. This average DC level varies linearly with the departure of the input data frequency from the expected data frequency. The output of the integrator is compared against a threshold by a comparator. This comparator generates an output signal indicating when the frequency of the input data signal is approaching the expected data frequency, i.e., the condition of beginning of record or beginning of data block. The threshold used by this last comparator may be adjusted to change the selectivity or bandwidth of frequencies that will result in the apparatus detecting the beginning of a data record.

12 Claims, 5 Drawing Figures

PATENTED JAN 15 1974

3,786,358

SHEET 2 OF 2

METHOD AND APPARATUS FOR DETECTING THE BEGINNING OF DATA BLOCK

BACKGROUND OF THE INVENTION

This invention relates to detecting the beginning of a data record by detecting the presence of the base frequency of the data record when it appears on a signal line. More particularly, the invention relates to detecting the beginning of a record block in the digital data signal received from a magnetic tape drive. The invention could also be used in detecting the beginning-of-data records received over communication lines.

HISTORY OF THE ART

In data recording with magnetic tape drives, record blocks are separated on the magnetic tape by interlock gaps wherein no signal is recorded. The beginning of a record block is defined by a preamble made up of a repetitive data pattern. This pattern might be series of ones, series of zeros or alternate ones and zeros for forty bit positions, eighty bit positions, or some other length. During the premable, the beginning of a data record is detected. In the past this has been accomplished by sensing the amplitude of the analog signal produced by the magnetic heads reading the data on the magnetic tape. The analog signal was amplified at the tape drive and passed as an analog signal across an interface to the control unit where the amplitude sense function occurred.

To improve signal to noise ratios, the analog interface between the tape drive and the control unit was converted to a digital interface. Thus the amplitude sense function was moved to the tape drive and used to gate digital data from the tape drive to the control unit. The amplitude sense and data gate function is described in commonly assigned U. S. application Ser. No. 76,144, entitled "Method and Apparatus for Amplitude Sensing and Data Gating in a Magnetic-Storage Device with Digital Interface," and also in commonly assigned U. S. Pat. No. 3,670,304, entitled "Method and Apparatus for Detecting Errors Read from Moving-Magnetic-Storage Device with Digital Interface."

With digital data coming across the interface from the tape drive to the control unit, beginning-of-record detection by the control unit could no longer be accomplished by sensing the amplitude of an analog signal. Of course, an alternative is to move the beginning-of-record detection into the tape drive where the analog signal is still present. However, this means additional connections, usually one connection per track of data on magnetic tape between the tape drive and the control unit to convey to the control unit a beginning-of-record signal.

A first attempt at detecting beginning of record from the digital data received by the control unit was made by using an integrator on the digital signal and then sensing the average level of the digital signal produced by the integrator, in effect, an amplitude sense function based upon the digital signal. Such a technique has shortcomings in that the average level produced by the integrator only has meaning relative to a reference level for the digital signal. This reference level may move around erratically due to variations in the digital data signal sent across the digital interface. Thus, trying to sense the amplitude of the digital data signal to detect beginning of record requires elaborate controls to guarantee the reference level of the digital data signal being received. Accordingly, a beginning-of-record detector was needed that would operate with a digital data signal input and is independent of the voltage level variations that may occur in the digital data signal.

SUMMARY OF THE INVENTION

In accordance with this invention, the beginning of a data block is detected by using a digital frequency detection technique which has a continuous linear frequency selectivity characteristic. Positive and negative transitions in the digital data signal are converted to linear ramps. The ramps are utilized to time the period of the received data signal relative to the period of the expected data frequency. Logic is then utilized to produce a signal whose pulse duration is directly proportional to the deviation in frequency of present data signal from expected data frequency. The pulse duration signal is then measured to determine whether the deviation is sufficiently small that the digital data signal being received may be indicated as a true data block and thus the beginning of a data record.

The measurement of the frequency deviation of the received digital signal from the expected frequency can be accomplished by integrating the pulses whose duration represents the deviation. The integration will produce a voltage level which is proportional to the deviation frequency and thus proportional to the frequency of the received digital signal. By comparing this voltage level against a threshold, the apparatus can indicate whether the digital signal received is within an allowable tolerance range of the expected data frequency. If the range is within tolerance, beginning of record will be indicated by the comparator.

As an additional feature, the base frequency from which the apparatus indicates the deviation in frequency may be selectively changed. This change is accomplished by changing the slope of the ramp signals or by changing the threshold in the comparator that responds to the ramp signals.

As a further feature of the invention, the selectivity or tolerance range may be changed by adjusting the band threshold against which the integrated deviation signal is measured. Stated another way, the changing of the threshold against which the average deviation signal is compared effectively changes the bandwidth over which the apparatus is operative to indicate beginning of record.

Further, the band threshold can be changed automatically to change the bandwidth to a wider band upon detection of beginning of record. Thus the bandwidth is small and the selectivity high while beginning of record is being found and subsequently, after the record or data block has been found, the band width is widened. This is useful in that the data frequencies, after the preamble of a record has been detected, varies over a wider frequency range depending upon the configuration of the code in the actual data record.

Further, the detector apparatus can be used to detect loss of data record if measurement of the frequency deviation indicates that the frequency of the signal being received has moved outside the wide band frequency range. Thus by comparing the beginning of record output signal against beginning-of-record output signal from adjacent tracks a dead track condition can be detected by noting that the beginning-of-record signal for one or more tracks has dropped out.

The advantage of the invention lies in its ability to give reliable indication of a data frequency present. Further, the apparatus is digital in configuration, but adjustable continuously over a frequency range so that its selectivity may be changed. Further, the base frequency about which the apparatus measures the frequency deviation may be easily adjusted.

The foregoing and other features and advantages of the invention will be apparent from the following more particular description of a preferred embodiment of the invention as illustrated in the accompanying drawings.

DESCRIPTION OF PREFERRED EMBODIMENT

Figure 1:
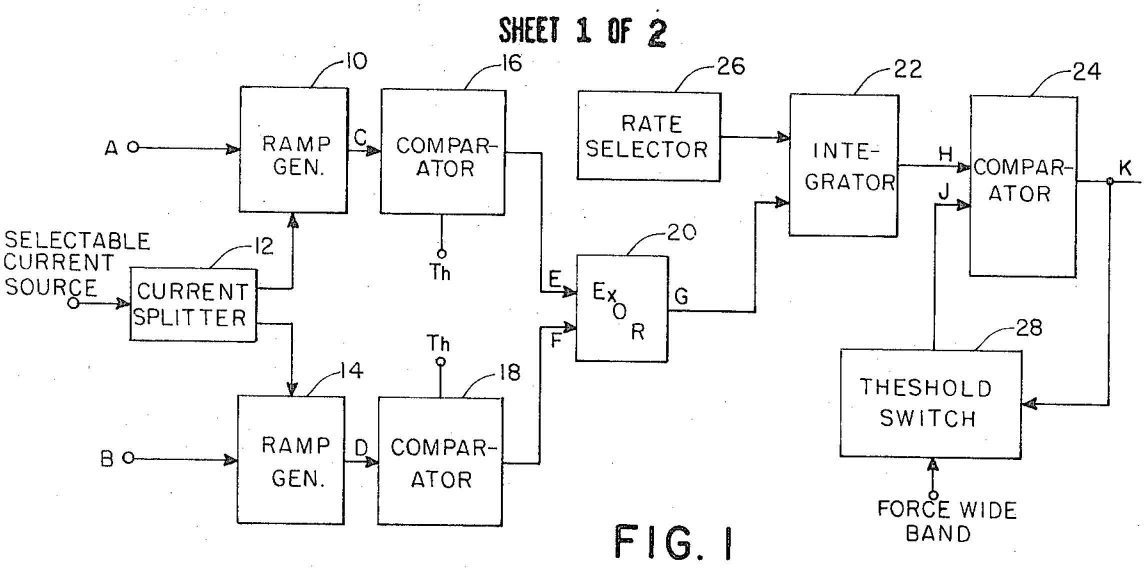
FIG. 1 is a schematic block diagram of the preferred embodiment of the invention.
Figure 2:
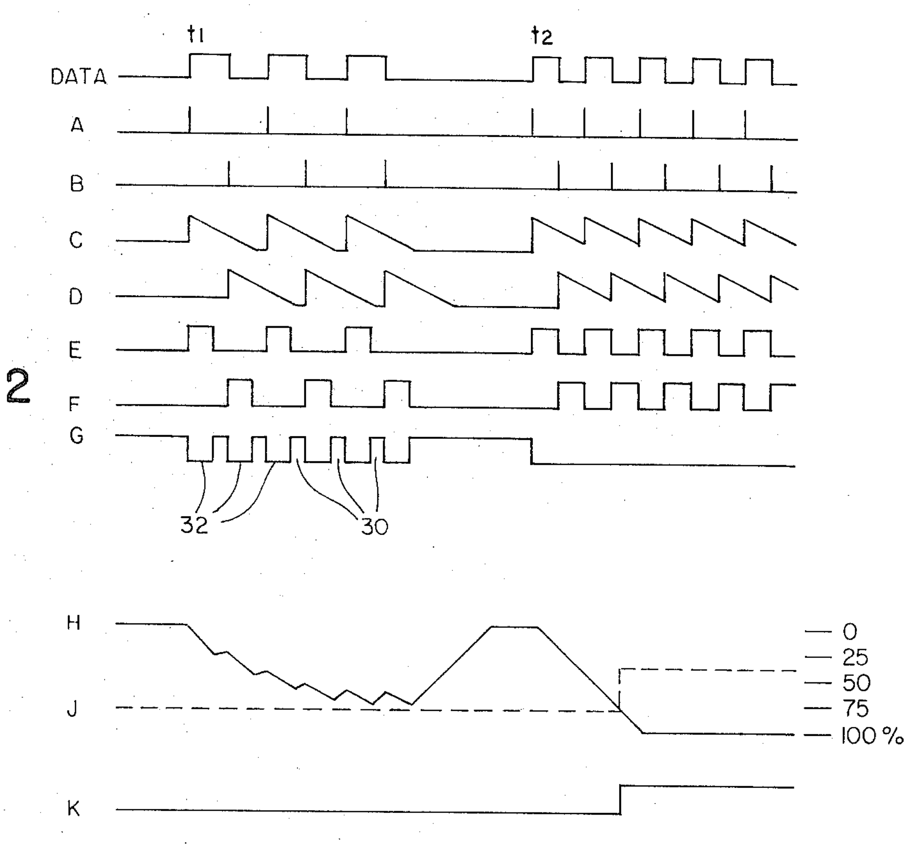
FIG. 2 shows waveforms that appear in FIGS. 1 and 4.

Now referring to FIGS. 1 and 2, the preferred embodiment of the invention is shown in functional blocks and waveforms that occur in the preferred embodiment as shown in FIG. 2. The input signals A and B are pulses at the positive transition and negative transition time of a data signal. The data signal per se is not used in the preferred embodiment as shown in FIG. 1, but is converted into the pulses of waveforms A and B. This could be accomplished, for example, by using a single shot triggering on positive transitions to generate the pulse waveform A and another single shot triggering on negative transistions to create the pulse waveform B.

The positive transition of pulses is applied to ramp generator 10. Ramp generator 10 produces a sawtooth waveform C. At each occurrence of a pulse in waveform A the ramp generator is set to a high voltage and proceeds to dissipate that voltage at a controlled rate, thus yielding the sawtooth waveform C. The voltages are dissipated by a controlled current discharging a capacitor. The current is passed to the ramp generator 10 from the selectable current source (not shown) via the current splitter 12.

Ramp generator 14 operates in exactly the same manner as ramp generator 10 except that it is set to its initial high voltage at the beginning of each sawtooth by the negative transition pulses, i.e., the pulses of pulse waveform B. Ramp generator 14 is matched to ramp generator 10 so as to have exactly the same sawtooth characteristic waveform. The current from the selectable current source that controls the dissipation of voltage by the ramp generators 10 and 14 is split equally between the ramp generators 10 and 14 by the current splitter 12.

The sawtooth waveforms C and D from the ramp generators are applied to comparators 16 and 18. Comparators 16 and 18 compare each sawtooth waveform against a threshold level. The ramp generators 10 and 14 cooperate with the comparators 16 and 18 respectively so as to define a time period from the time the ramp is reset to the high voltage until the voltage of the ramp is dissipated to a point where it passes below the reference threshold of the comparator. This time interval is adjusted to correspond to one-half the period of the base frequency expected for the digital data. This period, which is effectively detected by the cooperation between the ramp generator and the comparator, can be adjusted either by adjusting the threshold level at the comparator, or by adjusting the slope or rate of dissipation of the voltage at the ramp generator. In the preferred embodiment the slope of the ramp is adjusted. The adjustment of slope is made by adjusting the current supplied to the ramp generator by selecting another current source supplying the selectable current source line.

The output of comparators 16 and 18 is a two-level digital signal shown as waveforms E and F respectively. Note that during a data signal the duration from positive to negative transitions in waveforms E and F is always constant. As just discussed above, this is due to the slope of the sawtooth waveforms from ramp generators 10 and 14 and the threshold level of the comparators 16 and 18. On the other hand, the duration during a data signal of the low level condition in waveforms E and F, i.e., between negative transition and positive transition, will vary depending upon the frequency of the input digital data signal.

The digital signals E and F are applied to an exclusive-OR circuit 20 which logically combines the signals E and F to produce waveform G. The function of the exclusive-OR is that each time waveforms E and F are in phase, or are identical, the exclusive-OR will have an up level output. Conversely, each time the waveforms E and F are out of phase, or are at opposite levels, waveform G will have a down level as an output. In effect, during data signal the up level indicates the frequency of the incoming digital signal is different from the expected digital data frequency, while a down level indicates a digital data signal of expected frequency is being received. In addition, the duration of an up level when a digital signal is being received is a measure of the amount of frequency deviation of that signal from the expected data frequency. Measurement of the duration of this up level, and thus measurement of the frequency deviation, is accomplished by integrator 22 and comparator 24.

Integrator 22 integrates the waveform G to produce waveform H. The rate of integration or responsiveness of the integrator is controlled by rate selector 26. As shown in waveform H, integrator 22 operates so that over approximately three data cycles it reaches the average value of waveform G and ripples around that average value. Of course, the number of data cycles to reach the ripple level depends upon the rate of integration.

The rate of integration is selectable by the rate selector 26. As an example, it may be desirable to let the integration operate for 10 data bit or data frequency cycles before the integrator reaches the average DC level of waveform G. Subsequently, if the apparatus were used in other data communications or data recording system, it might be desirable to operate at a different data frequency. In this case to maintain the same relative integration time of 10 data frequency cycles, the rate of integration would have to be changed. Therefore, the rate selector 26 is provided.

Comparator 24 operates to compare the voltage over line H against a threshold level indicated by waveform J. Note that waveform H is an inverted waveform in that it goes more negative as the frequency deviation increases. The maximum voltage swing for waveform H would be defined by amplification of the up level of waveform G and amplification of the down level of waveform G. The up level and down level correspond respectively to deviating far off frequency as for DC signal and being right on frequency.

As shown in FIG. 2, the threshold J is initially set at approximately 80 percent of the down level. Since the down level corresponds to on frequency, a threshold of 80 percent corresponds to approximately deviation up to 2.2f or a frequency band sensitivity of 0.8f to 1.2f. Therefore, when a signal H exceeds the threshold (in this case goes below the threshold), comparator 24 has an output indicating that the digital signal received is within the frequency band that the frequency detector is looking for.

Figure 3:
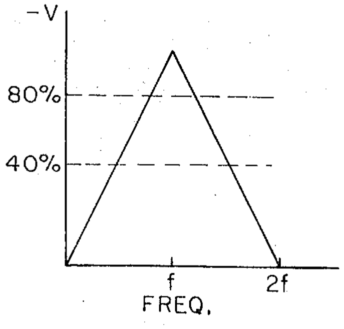
FIG. 3 shows the average voltage level of the deviation signal as a function of variation from the base frequency f.

In FIG. 3, the relation between frequency and the voltage of waveform H when it has reached the average level of waveform G applied to the integrator is shown. Two thresholds of 80 and 40 percent are shown in FIG. 3. FIG. 3 is most interesting in that it shows the frequency deviation is a linear relationship relative to the average level of waveform G, i.e., waveform H which is waveform G integrated. Thus waveform H reaches a maximum voltage as the frequency of the digital signal approaches the base frequency of the expected digital data signal. As the input digital signal moves away in frequency from the expected data signal, the average level of waveform G decreases and thus waveform H decreases.

The thresholds shown in FIG. 3 and represented by waveform J in FIG. 2 are provided by the threshold switch 28 of FIG. 1. Initially, the threshold switch 28 provides the 80 percent threshold to the comparator 24. Immediately upon comparator 24 indicating that this 80 percent threshold has been exceeded, threshold switch 28 is switches to change the threshold to a lower level such as 40 percent.

The thresholds 80 and 40 percent effectively indicate the frequency band over which the detector is selective. An 80 percent threshold corresponds to approximately a frequency band of 0.8f to 1.2f, while a 40 percent threshold corresponds to approximately a frequency band of 0.4f to 1.6f.

OPERATION OF PREFERRED EMBODIMENT

As an example of operation, assume the data signal shown at the top of FIG. 2 is being received. The expected data frequency, or expected data signal, is shown in the right half of FIG. 2. A burst of erroneous or unwanted signal preceeds the desired digital signal and is shown in the left half of FIG. 2 at time $t_1$. Defining the frequency of the expected data signal as $f$, the unwanted data signal at $t_1$ has a frequency of approximately $\frac{2}{3}f$.

The data signal is converted by single shots to pulses for the positive and negative transistions as shown in the pulse waveforms A and B. Ramp generator 10 and comparator 16 cooperate to produce waveform E, while ramp generator 14 and comparator 18 operate to produce the waveform F. As previously pointed out, the duration of the down level in waveforms E and F is a function of the deviation of the frequency of the input digital signal from the expected frequency.

Exclusive-OR 20 logically combines waveforms E and F to produce the waveform G. Waveform G indicates those portions of E and F that are in phase and those portions of E and F that are out of phase with each other. The out of phase portions indicated by the up level pulses 30 in waveform G are indicative of the frequency deviation from the expected frequency. In fact, the duration of the up level signals 30 relative to the down level signals 32 is a measure of the deviation of the frequency of the digital signal from the expected frequency.

Waveform G is then integrated by integrator 22. Because the duration of the up levels 30 is one-half the duration of the down levels 32, integrator 22 will produce a voltage level signal H which ultimately will ripple around a voltage level which is 67 percent of the maximum down level, i.e., the average level of waveform G while the unwanted digital signal of frequency $\frac{2}{3}$f is present.

With the threshold J set at 80 percent, waveform H, during the unwanted digital signal at $\frac{2}{3}$f, will not exceed the threshold J. After the unwanted signal dies out, waveform G returns to its up level state and waveform H returns gradually to the up level as integrator 22 integrates waveform G.

At time $t_2$ the genuine data frequency signal begins to appear at the input to the beginning-of-record detector. The ramp generator 10 and comparator 16 combination produces waveform E while ramp generator 14 and comparator 18 produce waveform. F. Because the frequency of the data signal is now the expected frequency, waveforms E and F have equal portions during their positive and negative levels and are always out of phase. Stated another way, the time from maximum voltage of the ramp to the point where the threshold of comparators 16 and 18 is satisfied is exactly equal to one-half the period of the base frequency of the data signal now being received. Thus waveforms E and F after time $T_2$ have equal up level and down level time durations. With waveforms E and F always out of phase after time $t_2$, waveform G drops to the down level and stays at the down level.

Integrator 22 will then integrate towards the down level or integrate to the 100 percent value. As waveform H goes through the 80 percent threshold comparator 24 generates an output signal indicates that a frequency within 20 percent of the expected data frequency is being received. The output signal K is fed back to the threshold switch 28 which immediately drops the threshold to the 40 percent threshold level, insuring that the indiction of beginning of record will continue at the output of the comparator 24. If this threshold were not dropped immediately, a ripple voltage near the threshold could possibly cause the output of the comparator to jitter between an up and down level.

DESCRIPTION OF CIRCUIT SCHEMATIC FOR PREFERRED EMBODIMENT

Figures 4, 5:
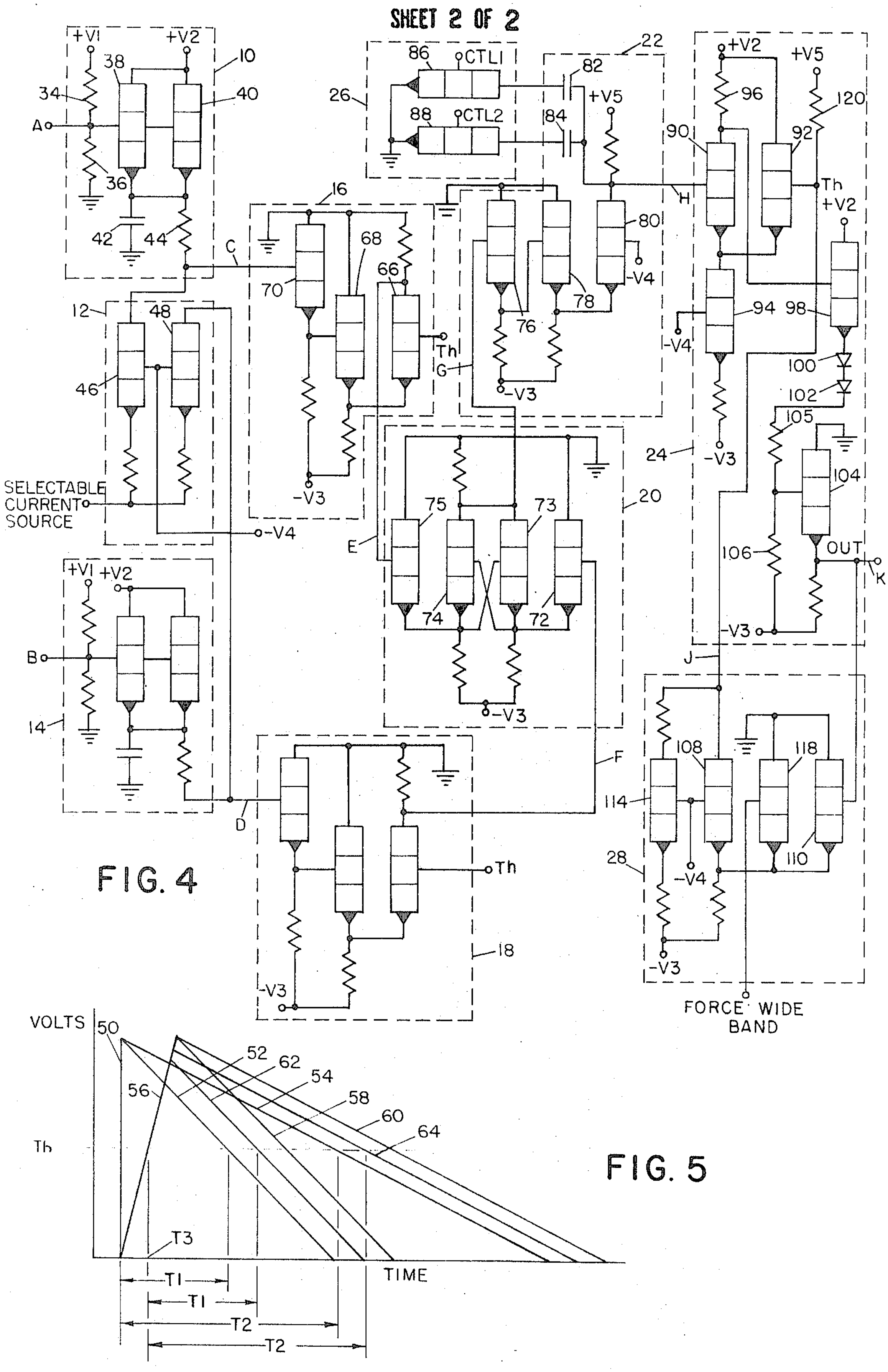
FIG. 4 shows a schematic circuit diagram of the preferred embodiment of FIG. 1.
FIG. 5 is an enlargement of the ramp waveforms C or D in FIG. 3.

In FIG. 4 the circuits to implement the preferred embodiment of FIG. 3 are shown. Portions of the circuit schematic that correspond to the blocks in FIG. 1 have been outlined in dash lines and given the same reference numerals as those in FIG. 1.

Ramp generator 10 receives the pulse waveform A. The resistors 34 and 36 are bias resistors. Transistors 38 and 40 are coupled together in parallel and are both turned on during the duration of a pulse in waveform A. In effect, a pulse in waveform A causes a large quantity of current to pass through transistors 38 and 40 to charge capacitor 42 to an up level voltage. Predetermined current from a selectable current source then discharges capacitor 42 through the current splitter 12 and resistor 44.

Transistors 46 and 48 are biased on to split the current from the current source equally between ramp generator 10 and ramp generator 14. The output from ramp generator 10 is taken off of the resistor 44.

The function of resistor 44 is to compensate for the finite flyback time of the ramp each time the capacitor 42 is charged up to its high level voltage. In FIG. 5 some example single sawtooth waveforms are shown for two different frequencies. Lines 50, 52 and 54 of the waveform represent the ideal condition where the time to charge capacitor 42 is zero and is represented by line segment 50. Capacitor 42 would then be discharged at a constant rate by the current from the selectable current source. The discharge rate would depend upon the current selected and is represented by ramps 52 and 54. In other words, by selecting a suitable current source, the capacitor 42 voltage could be discharged along ramp 52 or ramp 54. The important relationship of the ramps to the threshold is that the time such as $T_1$ between when the voltage on the capacitor goes above the threshold and when it falls back below the threshold is a predetermined time interval. As previously pointed out, this predetermined time interval is equal to one-half the period of the base frequency for the expected data signal. Thus for two different data frequency signals which are a multiple-of-two of each other, the selectable current source has a current to provide a ramp 52 and 54 which will define a time interval of $T_1$ and $T_2$ respectively.

Unfortunately, the flyback time to recharge capacitor 42 is not zero or instantaneous, but is finite. In actuality, the charging of capacitor 42 is more nearly represented by line segment 56 in FIG. 5. Line segment 56 crosses the threshold at time $t_3$. Therefore, the time period $T_1$ should be measured from $t_3$, or stated another way, the ramp should cross the threshold again on its way down a time $T_1$ after $t_3$. To accomplish this, resistor 44 was added to produce a voltage drop from the actual ramp voltage on the capacitor 42. The actual ramp voltage on the capacitor 42 is shown by the line segments 58 and 60 for the two different selectable currents on the two different selectable ramps. Resistor 44 provides a voltage drop relative to the capacitor voltage 42 so that the ramp voltages seen at the output of the ramp generators are the line segments 62 and 64. Resistor 44 is chosen such that the ramps 62 and 64 will intersect the threshold at the predetermined time period $T_1$ or $T_2$ after time $t_3$.

Comparator 16 receives the sawtooth waveform C and compares it against the threshold level Th applied to the base of the transistor 66. Transistors 66 and 68 perform the comparison function while transistor 70 operates as an emitter follower. The output of the comparator 16 is taken off the collector of transistor 66.

In operation of comparator 16, transistor 68 is on when signal C is above the threshold. At this time transistor 66 is off as it is back biased, and the voltage at its collector is at the up level for waveform E which is ground voltage. When the waveform C goes below the threshold voltage, transistor 68 turns off and transistor 66 turns on dropping the voltage at its collector to some negative voltage level which is the down level in waveform E.

The ramp generator 14 and the comparator 18 operate in exactly the same manner as the ramp generators 10 and 16 just described. Thus the next operating circuit of interest is the exclusive-OR circuit 20.

Exclusive-OR 20 is made up of four transistors 72, 73, 74 and 75. The output is taken off of the collectors for transistors 73 and 74. Input signals E and F are applied to the bases of transistors 75 and 72 respectively. When waveforms E and F are in phase, effectively the same signal is being applied to the bases of transistors 75 and 72. The emitters of transistors 72 and 75 will follow their bases with approximately a half volt drop across the base to emitter junction. The emitter junction of transistor 72 is connected to the emitter of transistor 73 and the base of transistor 74. Likewise, the emitter of transistor 75 is connected to the emitter of transistor 74 and the base of transistor 73. With the same voltage being applied to the emitter of transistors 72 and 75, transistors 73 and 74 will be back biased and turned off. Thus the signal out of waveform G will be at its up level which is near ground.

When the signals E and F are out of phase, then one of the pair of transistors 75 and 73, or 72 and 74, will be turned on. Which pair is turned on will depend upon whether E is a higher voltage than F or F is a higher voltage than E. With either transistor 73 or 74 turned on the output voltage at their collectors dropped to some negative voltage value relative to ground, and this is the lower level indicated in waveform G.

Waveform G is then applied to the integrator 22. Integrator 22 is isolated from exclusive-OR 20 by transistors 76 and 78 configured as emitter followers. The output of transistor 78 is taken off the emitter and applied to the emitter of transistor 80 which forms an active integration circuit with capacitor 82 or 84. The selection of which capacitor or combination of capacitors is operative in integrator 22 is controlled by transistors 86 and 88 which make up the rate selector 26.

By activating control signal 1 and not control signal 2, capacitor 82 is the capacitor controlling the integration rate. Conversely, if control signal 2 is operative, capacitor 84 controls the integration rate. A third option would be to activate both control signals 1 and 2 and have the integration rate controlled by the parallel combination of capacitors 82 and 84.

Comparator circuit 24 takes the integrated signal waveform H off of the collector of transistor 80. Transistors 90 and 92 perform the comparison function. Transistor 94 which is tied to the emitters of transistors 90 and 92 is a current source. The output of the comparison function is taken off of the collector of transistor 90.

The threshold is applied to the base of transistor 92 and is received from the threshold switch circuit 28. The integrated waveform H is applied to the base of transistor 90. Whenever the waveform H goes below the threshold J, transistor 90 switches from a conducting to a non-conducting state because it is then back biased. The output taken off of the collector of transistor 90 then moves up from a low voltage to a higher voltage, $+V_2$, because resistor 96 is no longer conducting current. Thus waveform K moves from a low level to a higher level when the waveform H exceeds (goes below) the threshold J. The output of the comparison function is passed through transistor 98 and diodes 100 and 102 which operate to shift the output voltage level. The shifted voltage level signal is applied to the base of the transistor 104 through biasing resistors 105 and 106. Transistor 104 is operating as an emitter follower. The output of the comparator 24 which also the output of the beginning-of-record detector is taken off of the emitter of transistor 104.

Waveform K which is the output of the beginning-of-record detector is fed back to the threshold switch 28. When the threshold switch is at the high threshold or 80 percent threshold, transistor 108 is conducting and the threshold is fixed by the current supplied by transistors 108 and 114 determing the voltage drop across resistor 120. On the output signal waveform K this corresponds to the down level which is below $-V_4$. Such a down level would be passed across the base-to-emitter junction of transistor 110 to the emitter of transistor 108 and keep transistor 108 conducting. When the high threshold is exceeded, and the waveform K goes to its up level, the voltage at the emitter of transistor 108 goes near the up level which is above $-V_4$ and transistor 108 turns off. The threshold is then specified by current supplied by transistor 114 alone determining the voltage drop across resistor 120. This threshold makes up the 40 percent threshold.

Transistor 118 is provided in the threshold switch to force the detector to wide band frequency detection if desired. If a voltage more positive than $-V_4$ were applied to the base of transistor 118, transistor 108 would turn off and the threshold would be switched to the 40 percent level or wide band threshold.

It will be apparent to those skilled in the art that the threshold produced by the threshold switch 28 can be set at any value between the zero and 100 percent levels of waveform H. In this way, the selectivity of the beginning-of-record detector may be adjusted. It will also be apparent to those skilled in the art that many time measurement circuits, logic circuits, and voltage level detection circuits could be substituted for the particular circuits described herein. While the invention has been particularly shown and described with reference to a preferred embodiment thereof, it will be understood by those skilled in the art that additional changes in form and details other than those suggested above may be made therein without departing from the spirit and scope of the invention.

What is claimed is:

1. Apparatus for identifying the presence of an expected digital signal on a digital signal input line comprising:
   - means for digitally detecting continuously over a frequency range the frequency deviation of the base frequency of the input digital signal from the base frequency of the expected digital signal;
   - means for measuring the deviation against an acceptable tolerance range and indicating the presence of the expected signal if the deviation is within the acceptable tolerance range.

2. The apparatus of claim 1 wherein said detecting means comprises:
   - means for comparing the period of the digital signal being received and the period of the expected digital signal and generating a time difference signal whereby the time difference corresponds to a period deviation and thus a frequency deviation.

3. The apparatus of claim 1 wherein said detecting means comprises:
   - means for generating a ramp signal where each ramp is initiated by the periodic transitions in the digital signal;
   - means for sensing when the ramp signal crosses a threshold whereby the time from ramp-initiated until ramp-crosses-threshold corresponds to a first period related to the frequency of the expected digital signal, and the time from ramp-crosses-threshold until ramp-initiated corresponds to a second period related to the frequency of the received digital signal;
   - means responsive to said sensing means for generating a pulse waveform where the duration of the pulses corresponds to deviation of said second period from said first period and thereby to the frequency deviation of the received digital signal from the expected digital signal.

4. The apparatus of claim 3 and in addition:
   - means for adjusting the slope of the ramp generated by said generating means so that said first period related to the frequency of the expected digital signal may be adjusted to change the expected frequency.

5. Apparatus for detecting the beginning of a data block in a received digital signal comprising:
   - means for comparing the duration of digital signal cycles against a period corresponding to the frequency expected in a data block;
   - logic means responsive to said comparing means for generating a pulse waveform where the pulse duration is indicative of frequency deviation of the received digital signal from the expected data block frequency;
   - means responsive to said logic means for measuring the duration of pulses in the pulse waveform over a predetermined length of the pulse waveform to thereby detect the frequency deviation over a predetermined time and indicate beginning of data block if the frequency deviation is acceptable.

6. Apparatus of claim 5 wherein said comparing means comprises:
   - means for indicating the duration of digital signal cycles as compared to said period and generating a comparison signal indicative of both the frequency of expected data block and the frequency of received digital signal.

7. Apparatus of claim 6 wherein said logic means comprises:
   - means responsive to said comparison signal for logically determining the difference between the frequency of expected data block and the frequency of received digital signal and producing pulses whose duration is indicative of the frequency deviation.

8. Apparatus of claim 6 and in addition:
   - means for adjusting said indicating means so that the frequency expected can be adjusted for different data block signals.

9. The apparatus of claim 5 wherein said measureing means comprises:
   - means for determining the average duration of pulses in said pulse waveform over said predetermined length of the pulse waveform;

means for comparing the average duration against a threshold duration and indicating beginning of data block when the threshold duration is satisfied.

10. The apparatus of claim 9 and in addition:
means for adjusting said threshold duration to thereby change the amount of frequency deviation acceptable when detecting the beginning of data block.

11. Method for detecting the presence of an expected frequency in a digital signal comprising:
comparing the base frequency of the digital signal against the expected frequency and indicating the frequency deviation over a continuous frequency bandwidth;
comparing the frequency deviation against a predetermined bandwidth about the expected frequency and indicating presence of expected frequency if frequency deviation indicates the frequency of the digital signal is within the predetermined bandwidth.

12. Method of claim 11 and in addition:
adjusting the bandwidth in the second comparing step so that the selectivity of the method in detecting the presence of an expected frequency may be varied.

* * * * *

PO-1050
(5/69)

UNITED STATES PATENT OFFICE
CERTIFICATE OF CORRECTION

Patent No. 3,786,358 Dated January 15, 1974

Inventor(s) Benjamin C. Fiorino

It is certified that error appears in the above-identified patent and that said Letters Patent are hereby corrected as shown below:

Column 1, line 12, "beginning-of-" should read --beginning of--.

Column 3, line 27, "3" should be --2--;

line 30, "FIGURES 1 and 2" should read --FIGURE 1--;

line 31, change "blocks" to --blocks.--;

line 32, "and waveforms" should read --Waveforms,--;

line 32, change "embodiment" to --embodiment,--;

line 33, change "as" to --are--.

Column 7, line 44, change "$t_3$" to --$T_3$--;

line 45, change "$t_3$" to --$T_3$--;

line 47, change "$t_3$" to --$T_3$--;

line 58, change "$t_3$" to --$T_3$--.

Column 8, line 26, after "out" insert --,-- and delete "of";

after "G" insert --,--;

line 33, change "dropped" to --drops--.

Column 10, line 63, change "measureing" to --measuring--.

Signed and sealed this 7th day of May 1974.

(SEAL)
Attest:

EDWARD M.FLETCHER,JR.
Attesting Officer

C. MARSHALL DANN
Commissioner of Patents